United States Patent [19]

Kirma

[11] Patent Number: 5,018,987
[45] Date of Patent: May 28, 1991

[54] END HOUSING FOR MULTIPOLE ELECTRICAL PLUG AND SOCKET CONNECTORS

[75] Inventor: Safa Kirma, Wedel, Fed. Rep. of Germany

[73] Assignee: Messerschmitt-Bölkow-Blohm GmbH

[21] Appl. No.: 516,263

[22] Filed: Apr. 30, 1990

[30] Foreign Application Priority Data

May 6, 1989 [DE] Fed. Rep. of Germany ....... 3914936

[51] Int. Cl.⁵ .......................................... H01R 13/56
[52] U.S. Cl. .................................. 439/445; 439/470; 439/447
[58] Field of Search ............................... 439/445–448, 439/449, 470, 452–455

[56] References Cited

U.S. PATENT DOCUMENTS

| 1,276,216 | 8/1918 | Hawthorne | 439/447 |
| 1,572,563 | 2/1926 | Secretan | 439/447 |
| 1,836,571 | 12/1937 | Breetz | 439/447 |
| 4,583,804 | 4/1986 | Thompson | 439/470 |

FOREIGN PATENT DOCUMENTS 631237 6/1936 Fed. Rep. of Germany ...... 439/447

Primary Examiner—Gary F. Paumen
Attorney, Agent, or Firm—Toren, McGeady & Associates

[57] ABSTRACT

In an end housing of this type for the junction of cable harnesses surrounded by protective tubes to connectors, the end of a transition part facing the protective tube comprises a fastening element. The transition part is rotatably connected at least on one side to the tube or connector.

8 Claims, 4 Drawing Sheets

END HOUSING FOR MULTIPOLE ELECTRICAL PLUG AND SOCKET CONNECTORS

The present invention is directed to an end or terminal housing for multipole electrical plug and socket connectors, comprising a transition part with one end on the side of the plug-in connector and another end on the side of a cable for connecting cable harnesses which are embraced by protective tubes and in which the transition part is designed as a hollow member and comprises a cylindrical receiving region for retention of the plug-in connector.

BACKGROUND OF INVENTION

In arrangements of this type the problem exists that the insertion of the plug-in connector into the appropriate electrical device is complicated by the corresponding protective tubes and often cannot be accomplished in a space containing a plurality of plug-in and socket connectors. It is of particular significance that an arrangement with protective tubes for electrical shielding or for lightening protection of electrical connections cannot be interrupted by the terminal or connector elements.

SUMMARY OF INVENTION

It is an object of the present invention to provide end housings which enable a simple assembly and disassembly of plug-in and socket connectors and, to the extent that this is required, assures also an electrical interconnection.

In accordance with one aspect of the invention, the end of the transition part facing the protective tube comprises a receptacle for an attachment element which, with its one end, embraces an end profiled region of the protective tube in a frictionally locking manner and whose other end is rotatably retained in the receptacle.

In accordance with another aspect of the invention, alternatively the side of the transition part facing the plug-in connector comprises a cylindrical receiving element with a corresponding retention part for a rotatable connection, and at the other end of the transition part a fastening element is molded on, which fastening element embraces the end of the protective tube in a positively locking manner.

These features maintain rotatability with respect to the protective tube by means of a simple construction, in order to build up connections or disassemble same while simultaneously maintaining a good electrical connection.

SUMMARY OF DRAWINGS

Other objects and advantages will be apparent from the detailed description that follows of several different embodiments of the invention, taken in conjunction with the accompanying drawings wherein.

DETAILED DESCRIPTION OF PREFERRED EMBODIMENTS

Figure 1:
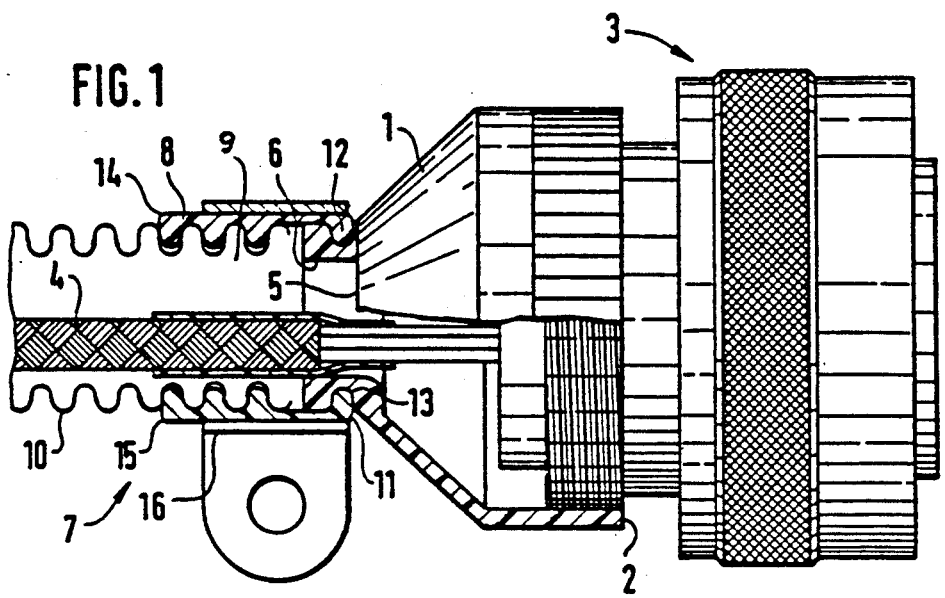
FIGS. 1 to 4 illustrate diagrammatically and partly in section several constructions in accordance with the invention with an end housing configured with a rotatable connection in the region of the protective tube.

FIG. 1 shows a protective tube 10 in the form of an annular corrugated flexible tube containing a cable harness 4 consisting of individual wires connected to a plug-in connector 3. A transition part 1 in the form of a hollow member, is arranged to act as a connection between the protective tube 10 and the plug-in connector 3, which transition part can be coupled at its one end 2 to the plug-in connector 3 by a threaded connection. For this purpose, the transition part 1 is rotatably connected at its left end side to one end 9 of the protective tube 10, by having one fastening element 7 embrace at one end 8 the protective tube 10 in a frictionally locking manner and by having its other end 11 engage with a bead 13 into a circumferential groove 14 of a receptacle 6 of the transition part 1. The attachment element 7 consists herein of half cylinders or shells 14, 15, which are held together by a clamping element 16 in the form of a hose clamp fitting. The inner surface of the attachment element 7 is designed to correspond and match to the profiling of the protective tube 10. Thus, while the transition part 1 is locked to the protective tube 10, it will rotate within attachment element 7 allowing the transition part 1 to be rotatably connected and disconnected to the connector 3 when assembly or disassembly of the cable 4 is required.

Figure 2:
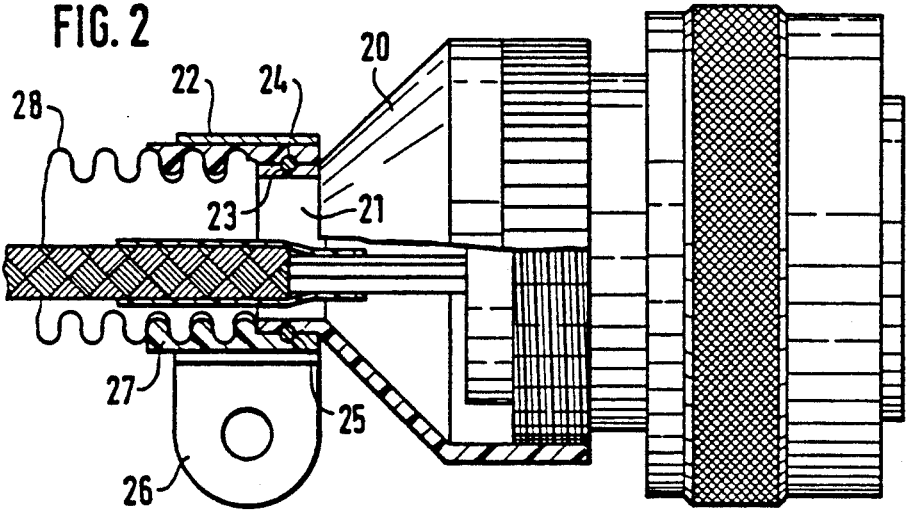

In the embodiment of FIG. 2, a transition part 20 comprises a receptacle 21 for receiving a fastening element 27 connected with a protective tube 28. Since the protective tube 28 is constructed as a corrugated hose, the fastening element 27 is configured as a single piece tubular element, and the receptacle 21 and fastening element 22 have matching circumferential grooves 23, 24; while a circular clip or snap ring 25 is used to form a rotatable connection between the part 20 and the fastening element 27. A tube clamp fitting 26 embracing the fastening element 22 is used mainly for grounding or dissipation of charge.

Figure 3:
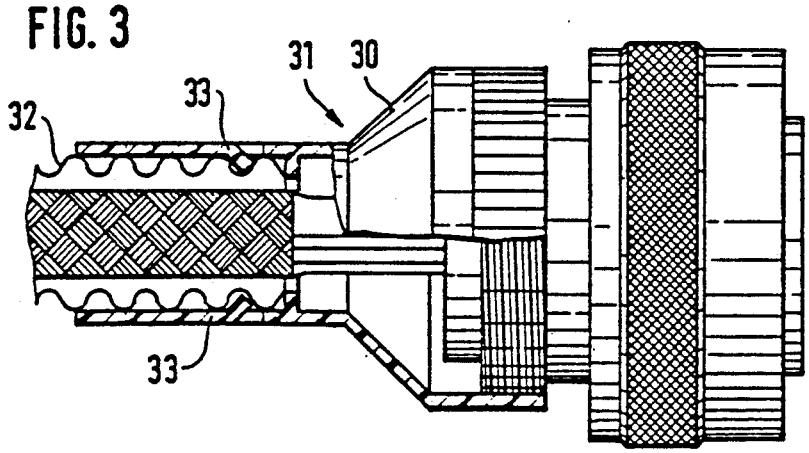

In another version depicted in FIG. 3, a transition part 30 forms an integral unit with an attachment or fastening element 31. The fastening element 31 has elastic snap-in elements 33 which snap into the profiled grooves of the protective tube 32. In this case, the rotatable joint is formed between the snap-in element 33 and the protective tube grooves.

Figure 4:
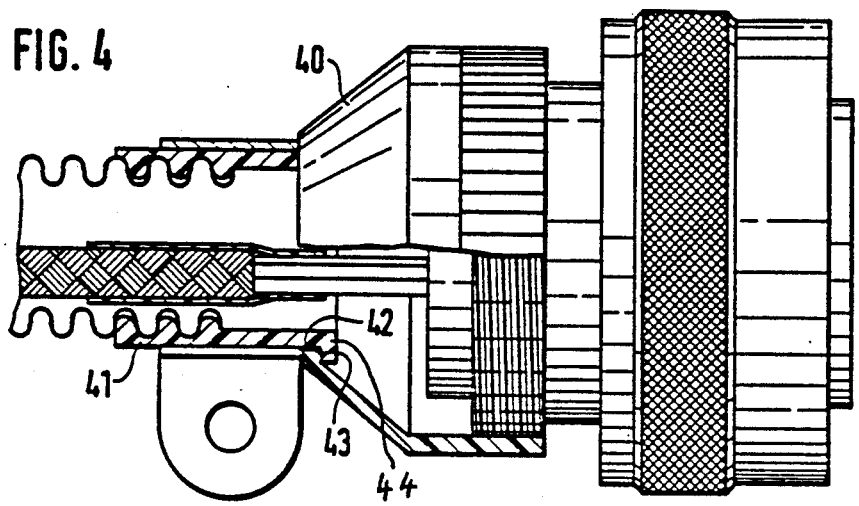

In the version depicted in FIG. 4, a receptacle 42 in the transition part 40 for a fastening element 41 is formed by an aperture with a backup surface 43 which rotatably attaches to a matching collar 44 of the fastening element 41.

In the next series of embodiments, the rotatable connection is formed at the connector end of the transition part 1.

Figure 5:
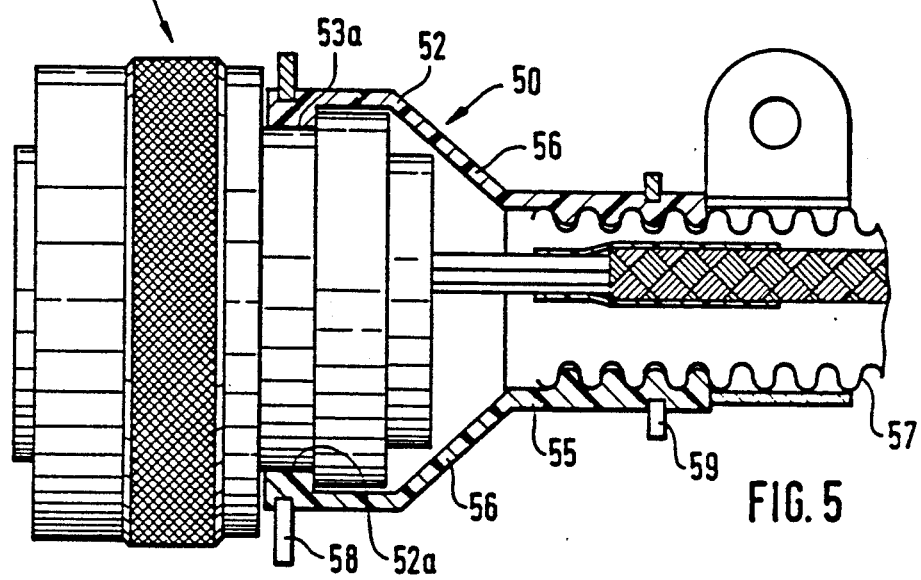
FIGS. 5 to 11 illustrate diagrammatically and partly in section several constructions in accordance with the invention with an end housing configured with a rotatable connection at the plug-in end of the receptacle.

As depicted in FIG. 5, a transition part 50 is rotatably supported at the side facing a plug-in connector 53. This is achieved by means of a cylindrical reception element 52 provided with a bead 52a, which engages into a circumferential groove 53a of the plug-in socket connector 53. A fastening element 55 is molded at the other end of the transition part 50, which embraces in a positively locking manner the end of a profiled protective tube 57. The transition part 50 is formed of half shells 56, 57 which are held together by clamping elements in the form of snap rings 58, 59.

Figure 6:
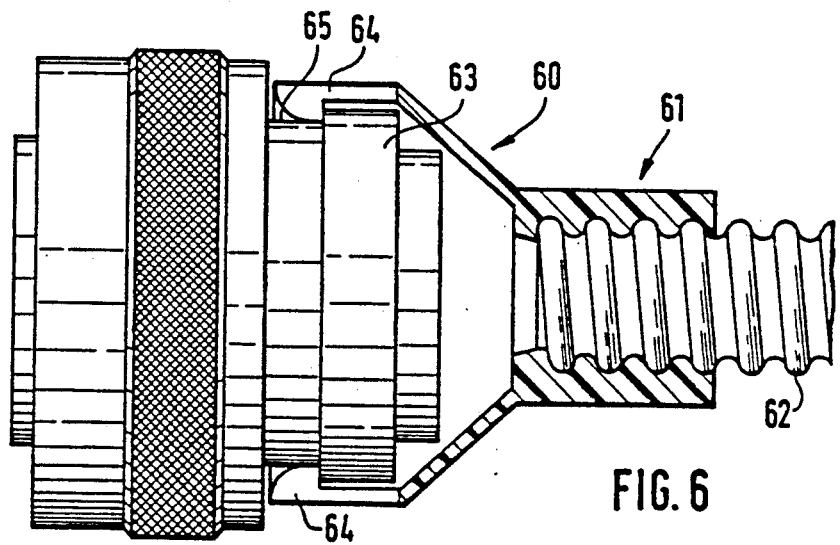

In another embodiment shown in FIG. 6, the rotatability of a transition part 60 is formed similarly to FIG.

5 by snap-in hooks 64, which engage into a circumferential groove 65 of the plug-in and socket connector 63. The protective tube 62 is constructed as a corrugated tube so that the fastening element 61 can be designed in one piece including the transition part 60 and thus can be rotatably threaded upon the corrugated tube. In this case, the corrugations would be helical rather than annular.

Figure 7:
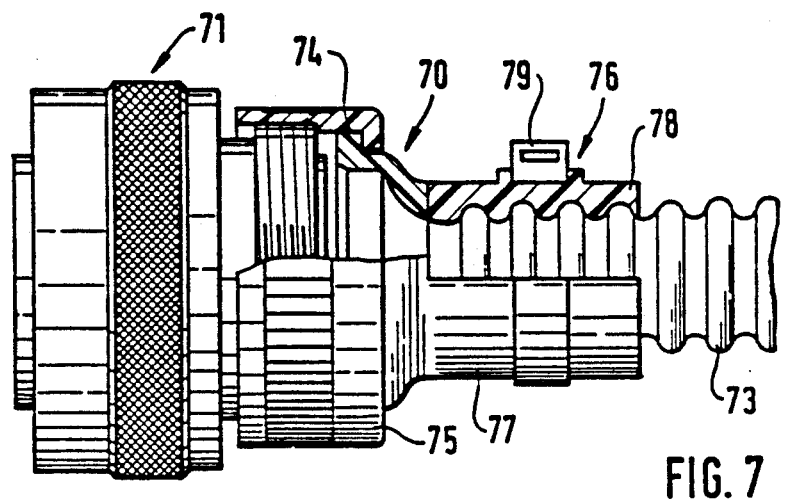
Figure 8:
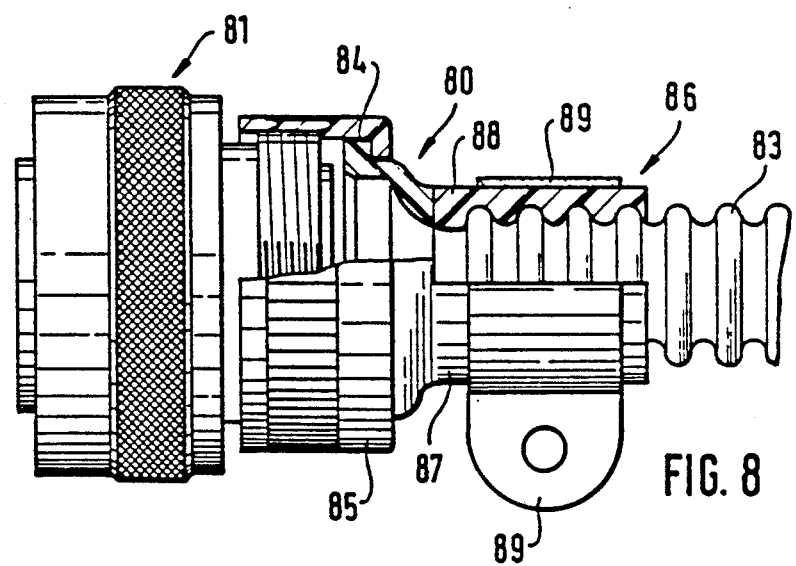
Figure 9:
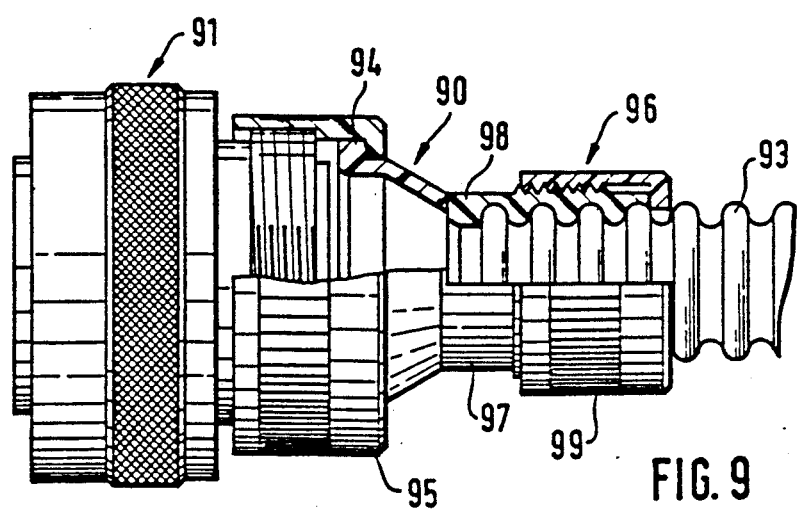

In the embodiments of FIGS. 7 to 9, attachments 76, 86 and 96 are rotatably coupled with their respective plug-in connector 71, 81 or 91 through a transition part 70, 80, 90 by means of a coupling ring nut 75, 85 and 95 having a flange like retaining edge 74, 84, 94 in which the transition part 70, 80, or 90 is retained by coupling ring nut 75, 85, 95.

These embodiments differ in that, in FIG. 7, a protective tube 73 is held by two halves 77 and 78 of the fastening element 76, which halves are held together by a cable binder 79. The part 77 is solidly connected with the transition part 70, while the part 78 is separable and can be positioned as an individual element over the part 77. In FIG. 8, a cable clamp fitting 89 is arranged as the clamping element, which holds the shells 87 and 88 upon the protective tube 83 so as to clamp same. In the version in FIG. 9, a threaded connector 99 for retention of the shells 97 and 98 also engages the protective tube 93 and acts as a clamping element therefor.

Figure 10:
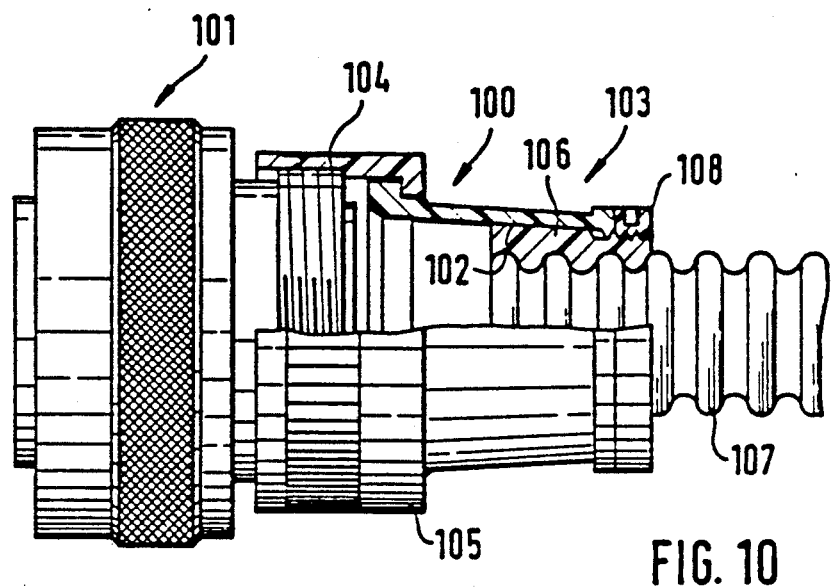

In FIG. 10, a fastening element 103 for a plug-in connector 101 is designed as a conical sleeve on its inner surface 102. Here, assigned clamping elements 106 are adapted and matched with their inner surface to the profiling of the protective tube 107. The clamping elements 106 are axially displaceable with respect to the fastening element 103 by means of a threaded connection 108. This exerts a clamping action on the tube. The transition part 100 is retained at the plug-in end also in the previously described manner by means of a threaded connection 104, 105.

Figure 11:
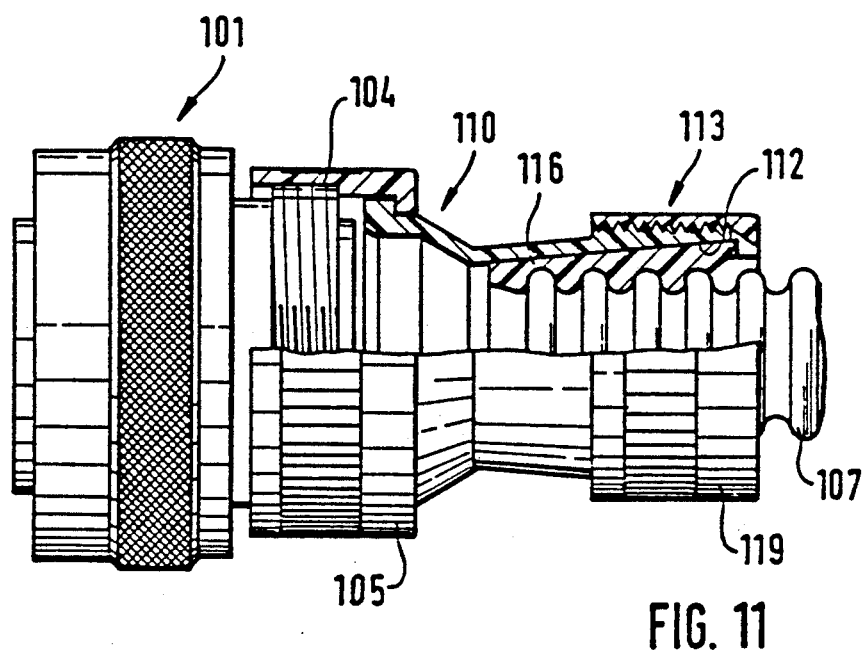

A corresponding arrangement is depicted in FIG. 11. Here, the inner surface 112 of the fastening element 113 is displaceably inclined in the opposite direction as a conical sleeve and the clamping element 116 is arranged to be displaceable at the fastening element 113 by means of a threaded element 119 for obtaining a clamping action.

In several of the depicted embodiments, the cable electrical lines which extend inside of the protective tube and are connected to the plug-in connector are not shown for simplicity. The various parts as shown can be constructed of conductive or non-conductive materials, of metal or plastic. Typically the protective tube and the transition and fastening members would be constituted of plastic, and the connector of metal. When electrical shielding is needed, conductive plastics can be employed.

While specific embodiments of the invention have been shown and described in detail to illustrate the application of the inventive principles, it will be understood that the invention may be embodied otherwise without departing from such principles.

What is claimed is:

1. A cable harness comprising a protective tube having a corrugated surface, electrical lines within the tube, a multipole electrical plug-in socket connector connected to the electrical lines, and a transition part having a first end adjacent the connector and a second end adjacent the protective tube for joining the connector to the protective tube, said transition part being a hollow member having at its first end a cylindrical receiving region for mounting to the plug-in connector and having at its second end a receptacle, a fastening element embracing with a first end thereof an end region of the protective tube in a frictionally locking manner and having a second end rotatably retained at the transition part receptacle, said fastening element comprising two separate half shells.

2. A cable harness comprising a protective tube having a corrugated surface, electrical lines within the tube, a multipole electrical plug-in socket connector connected to the electrical lines and having a threaded end, and a transition part having a first end adjacent the connector and a second end adjacent the protective tube for joining the connector to the protective tube, said transition part being a hollow member having at its first end a threaded cylindrical receiving region for threadingly mounting to the connector threaded end and having at its second end a receptacle, a fastening element embracing with an inner projection at a first end thereof a corrugated end region of the protective tube in a frictionally locking manner and having a second end rotatably retained at the transition part receptacle.

3. A cable harness according to claim 2, wherein the receptacle for the fastening element comprises a circumferential groove engaged by a surrounding bead of the fastening element to form a rotatable connection.

4. A cable harness according to claim 2, wherein the transition part receptacle and the fastening element comprise corresponding circumferential grooves, and a snap ring is mounted in the grooves to form a rotatable joint.

5. A cable harness according to claim 2, wherein the fastening element is configured as a single piece tubular element.

6. A cable harness according to claim 2, wherein the inner surface of the fastening element is configured to correspond with the profiling of the protective tube.

7. A cable harness according to claim 6, wherein the protective tube corrugations are annular or helically configured.

8. A cable harness according to claim 2, wherein the transition part receptacle for the fastening element comprises an aperture with a backup face for receiving the fastening element, and a clamp for holding the fastening element and the backup face together.

* * * * *

UNITED STATES PATENT AND TRADEMARK OFFICE
CERTIFICATE OF CORRECTION

PATENT NO. : 5,018,987

DATED : MAY 28, 1991

INVENTOR(S) : SAFA KIRMA

It is certified that error appears in the above-identified patent and that said Letters Patent is hereby corrected as shown below:

On the title page: Item [73] ASSIGNEE: --Messerschmitt-Bolkow-Blohm GmbH Ottobrunn, Federal Republic of Germany--.

Signed and Sealed this

Twentieth Day of April, 1993

*Attest:*

MICHAEL K. KIRK

*Attesting Officer*     Acting Commissioner of Patents and Trademarks